(12) United States Patent
Kajimura

(10) Patent No.: US 10,969,563 B2
(45) Date of Patent: Apr. 6, 2021

(54) LENS BARREL CONTROLLING LINEAR DRIVING OF MOVABLE LENS AND OPTICAL APPARATUS EQUIPPED WITH LENS BARREL

(71) Applicant: CANON KABUSHIKI KAISHA, Tokyo (JP)

(72) Inventor: Fumihiro Kajimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 16/226,878

(22) Filed: Dec. 20, 2018

(65) Prior Publication Data

US 2019/0196140 A1     Jun. 27, 2019

(30) Foreign Application Priority Data

Dec. 25, 2017 (JP) .............................. JP2017-248093

(51) Int. Cl.
| | |
|---|---|
| *G02B 15/14* | (2006.01) |
| *G02B 7/105* | (2021.01) |
| *G02B 7/10* | (2021.01) |
| *G02B 7/02* | (2021.01) |
| *G02B 7/08* | (2021.01) |
| *G01D 5/347* | (2006.01) |

(52) U.S. Cl.
CPC ......... *G02B 7/105* (2013.01); *G01D 5/34784* (2013.01); *G02B 7/028* (2013.01); *G02B 7/08* (2013.01); *G02B 7/102* (2013.01)

(58) Field of Classification Search
CPC ........ G01B 3/004; G01B 3/205; G01B 7/003; G01B 11/00; G02B 7/08; G02B 7/102; G02B 7/105; G02B 13/22; G02B 26/10; G02B 27/4255; G02B 27/4272; G02B 27/4277
USPC .................................. 359/676–706, 822–826
See application file for complete search history.

(56) References Cited

U.S. PATENT DOCUMENTS

| | | | |
|---|---|---|---|
| 9,347,802 B2 * | 5/2016 | Horiguchi | G01D 5/347 |
| 10,429,608 B1 * | 10/2019 | Baer | H04N 5/23212 |
| 2019/0377155 A1 * | 12/2019 | Bachar | H04N 5/2254 |

FOREIGN PATENT DOCUMENTS

| | | | |
|---|---|---|---|
| JP | 2003214835 A | * | 7/2003 |
| JP | 2003214835 A | | 7/2003 |
| JP | 2006258586 A | | 9/2006 |

\* cited by examiner

*Primary Examiner* — Mahidere S Sahle
(74) *Attorney, Agent, or Firm* — Rossi, Kimms & McDowell LLP

(57) ABSTRACT

A lens barrel that is capable of detecting an absolute position of a movable part with high accuracy. A first guide guides the movable part with an optical lens. A first sensor unit includes a first scale and first detection unit. The first scale in the movable part has a pattern that makes a signal output from the first detection unit monotonically increase. The first detection unit outputs the signal that continuously varies according to the movement. A second sensor unit includes a second scale in the movable part that has a periodic repeated pattern and a second detection unit that outputs a periodic signal by reading the second scale. A controller detects a position of the movable part based on the signals output from the first and second detection units. The first sensor unit is arranged nearer to the first guide in comparison with the second sensor unit.

11 Claims, 9 Drawing Sheets

LENS BARREL CONTROLLING LINEAR DRIVING OF MOVABLE LENS AND OPTICAL APPARATUS EQUIPPED WITH LENS BARREL

BACKGROUND OF THE INVENTION

Field of the Invention

The present invention relates to a lens barrel mounted on optical apparatuses including an image pickup apparatus like a digital camera, and specifically, relates to a lens barrel that controls linear driving of a movable lens and an optical apparatus equipped with the lens barrel.

Description of the Related Art

There is a known driving system that drives a focusing lens in a lens barrel in an optical axis direction with a linear driving actuator, such as a voice coil motor (hereinafter, referred to as VCM) or an ultrasonic motor using a piezoelectric device.

A position sensor that detects a position of the focusing lens is needed to control the position of the focusing lens when the focusing lens is driven. Since accuracy of a position sensor affects controllability of an focusing operation including stopping accuracy of a focusing lens, a position sensor that detects the position of the focusing lens with high accuracy is required.

There are an absolute position sensor that detects an absolute position within a drive range of a focusing lens and a relative position sensor that detects distance that a focusing lens moves. Generally, position detection accuracy of a relative position sensor is higher than that of an absolute position sensor in a case where the sensors have the same size and the same detection range. Accordingly, a focusing-lens driving system that uses a VCM or an ultrasonic motor with the high position accuracy employs a relative detection sensor of an optical method or a magnetic method in many cases.

Moreover, a focusing-lens driving system using a relative position sensor is provided with an origin position sensor that detects an absolute position (an origin position) of the focusing lens. And the system moves the focusing lens to an end until the origin position sensor detects the focusing lens when a camera is started. Then, the moving distance of the focusing lens from the detected origin position is detected by the relative position sensor, and the absolute position of the focusing lens is calculated. However, this system has a problem of taking time until detecting the absolute position of the focusing lens from the start up.

Consequently, Japanese Laid-Open Patent Publication (Kokai) No. 2006-258586 (JP 2006-258586A) discloses a system that arranges a relative position sensor with high position detection accuracy and an absolute position sensor whose position detection accuracy is lower than that of the relative position sensor are arranged. The system detects an absolute position with high accuracy using two detection results of the absolute position sensor and the relative position sensor. Thereby, the absolute position of the lens can be detected without detecting an origin position when a camera is started.

An absolute position sensor is constituted so as to obtain a signal that monotonically increases or decreases in a moving direction of a movable part. Japanese Laid-Open Patent Publication (Kokai) No. 2003-214835 (JP 2003-214835A) suggests a contact potentiometer and a noncontact optical sensor that consists of a photo interrupter and a shading plate having a triangular opening.

However, the above-mentioned conventional techniques have the following problems. When the potentiometer is used as a position sensor, since a slider that is a movable part of the potentiometer is connected to a movable lens group, slide of the slider becomes load of movement of the lens group. Moreover, a contact sensor is inferior to a noncontact sensor in durability.

In the meantime, when a mechanical backlash causes deviation of a positional relation between the shading plate and the photo interrupter of the noncontact optical absolute position sensor, an error occurs in an output value of the position sensor depending on a direction of the deviation, which disturbs detection of an absolute position with high accuracy. There is the same problem also in magnetic sensors, such as an MR sensor, other than an optical sensor.

As a countermeasure, it is possible to arrange a position sensor at a position with little backlash. However, when there are two position sensors, it is difficult to arrange the two position sensors in the same position with little backlash.

SUMMARY OF THE INVENTION

The present invention provides a lens barrel that detects an absolute position of a movable part using two sensors and an optical apparatus equipped with the lens barrel, which are capable of detecting the absolute position with high accuracy even when mechanical backlash occurs in the two sensors.

Accordingly, a first aspect of the present invention provides a lens barrel including a movable part that has an optical lens included in a photographing optical system that consists of a plurality of optical lenses, a first guide that guides movement of the movable part in an optical axis direction, a first sensor unit that includes a first scale and a first detection unit, the first scale being provided in the movable part and having a pattern that makes a signal output from the first detection unit monotonically increase from one end to the other end of a moving range of the movable part, the first detection unit outputting the signal that continuously increases or decreases according to movement of the movable part by reading the pattern of the first scale, a second sensor unit that includes a second scale that is provided in the movable part and has a periodic repeated pattern in a moving direction of the movable part and a second detection unit that outputs a periodic signal corresponding to movement of the movable part by reading the pattern of the second scale, and a controller configured to detect a position of the movable part in the optical axis direction based on the signal output from the first detection unit and the signal output from the second detection unit. The first sensor unit is arranged nearer to the first guide in comparison with the second sensor unit.

According to the present invention, the lens barrel that detects the absolute position of the movable part using two sensors is capable of detecting the absolute position with high accuracy even when mechanical backlash occurs in the two sensors.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1A:
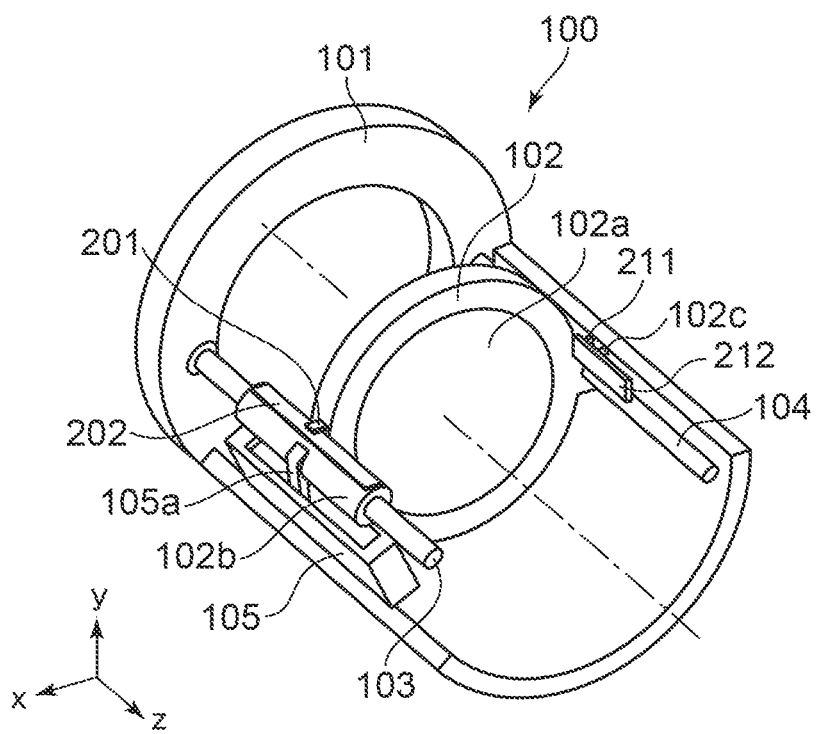
FIG. 1A is a perspective view showing a principal part of a lens barrel according to a first embodiment of the present invention.
Figure 1B:
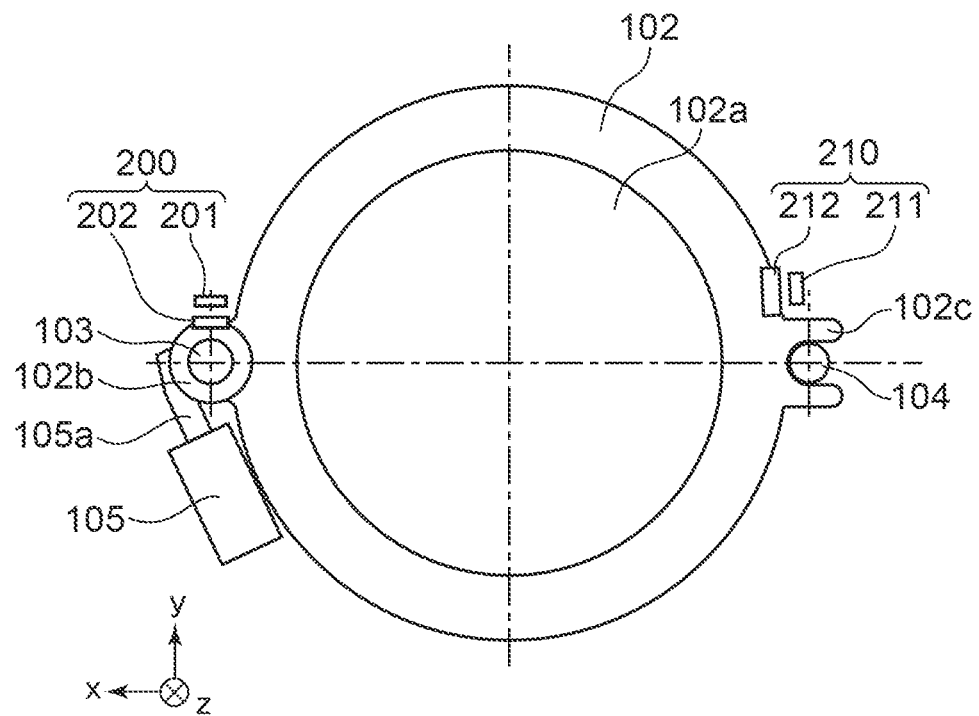
FIG. 1B is a view showing the lens barrel shown in FIG. 1A viewed in an optical axis direction.

FIG. 1A is a perspective view showing a principal part of a lens barrel according to a first embodiment of the present invention. FIG. 1B is a view showing the lens barrel shown in FIG. 1A viewed in an optical axis direction (a Z direction). It should be noted that components other than the principal part of the present invention are not shown in FIG. 1A and FIG. 1B.

As shown in FIG. 1A, a lens barrel 100 of the embodiment is provided with a lens base plate 101, lens holding frame 102, main guide bar 103, sub guide bar 104, and linear actuator 105. The lens base plate 101 is a stationary part of the lens barrel 100, and the lens holding frame 102 is a movable part holding a focusing lens group 102a as an optical lens. The main guide bar 103 and the sub guide bar 104 respectively extend in parallel with the optical axis direction and one ends are fixed to the lens base plate 101.

The main guide bar 103 and the sub guide bar 104 respectively correspond to a first guide and a second guide that are arranged apart from each other in a direction (a radial direction of the lens holding frame 102) that perpendicularly intersects with the optical axis and that guide the lens holding frame 102 so as to be movable in the optical axis direction. The main guide bar 103 engages with the lens holding frame 102 at an engagement part 102b. The sub guide bar 104 engages with the lens holding frame 102 at an engagement part 102c. The linear actuator 105 is a drive unit that engages with the lens holding frame 102 at a connection part 105a and drives the lens holding frame 102 in the optical axis direction.

The sub guide bar 104 functions as a rotation stopper for the main guide bar 103 when the lens holding frame 102 moves in the optical axis direction. Accordingly, an engagement length in a moving direction of the engagement part 102b of the lens holding frame 102 that engages with the main guide bar 103 is longer than that of the engagement part 102c of the lens holding frame 102 that engages with the sub guide bar 104. It should be noted that the lens barrel 100 has a plurality of lens groups including the focusing lens group 102a.

As shown in FIG. 1B, an absolute position sensor unit (hereinafter referred to as an absolute sensor) 200, which is a first sensor, consists of a detection unit 201 and a scale 202 on which a reading pattern is formed. A relative position sensor unit (hereinafter referred to as a relative sensor) 210, which is a second sensor, consists of a detection unit 211 and a scale 212 on which a reading pattern is formed.

The detection units 201 and 211 of the absolute sensor 200 and the relative sensor 210 are fixed and attached to the lens base plate 101. In the meantime, the scales 202 and 212 are attached to the lens holding frame 102 and move in the optical axis direction together with the lens holding frame 102. The detection units 201 and 211 are respectively arranged minutely apart from the scales 202 and 212. The absolute sensor 200 and the relative sensor 210 are noncontact position sensors.

The detection units 201 and 211 are respectively arranged at positions facing the scales 202 and 212. The detection units 201 and 211 read the scales 202 and 212 by emitting light and receiving reflection light and detect the position of the lens holding frame 102. A principle of position detection of the position sensor will be mentioned later. The absolute sensor 200 is arranged near the main guide bar 103 of which a gap between a shaft and a hole is small. The relative sensor 210 is arranged near the sub guide bar 104 of which a gap between a shaft and a hole is relatively large.

Figure 2A:
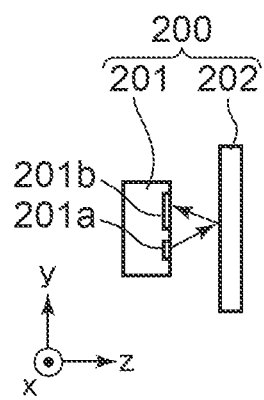
FIG. 2A is a side view of an absolute sensor included in the lens barrel in FIG. 1A.
Figure 2B:
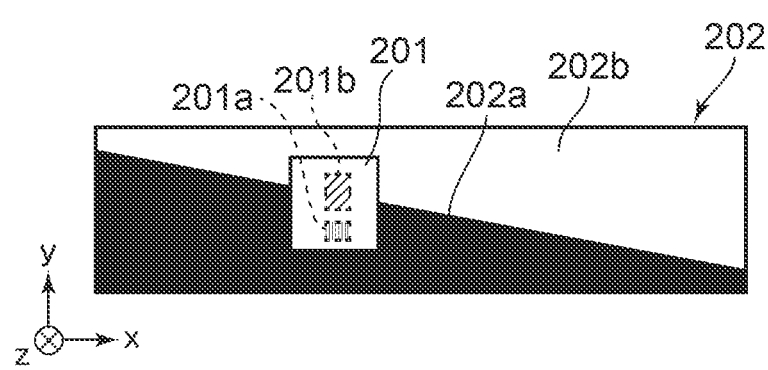
FIG. 2B is a front view of the absolute sensor.
Figure 2C:
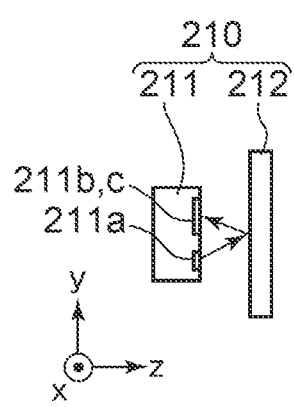
FIG. 2C is a side view of a relative sensor included in the lens barrel in FIG. 1A.
Figure 2D:
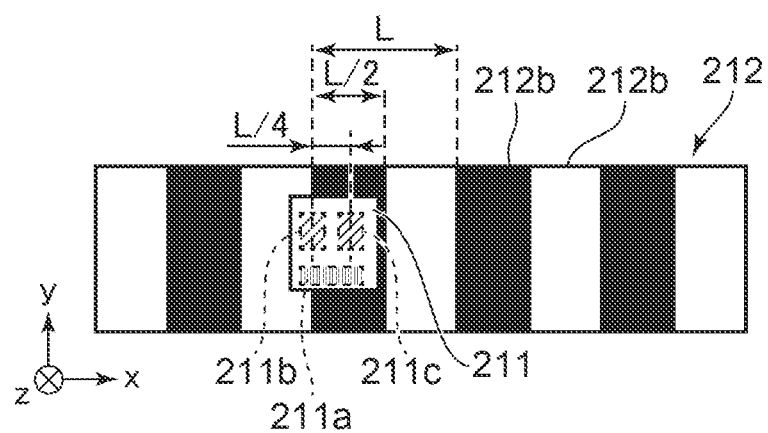
FIG. 2D is a front view of the relative sensor.
Figure 3A:
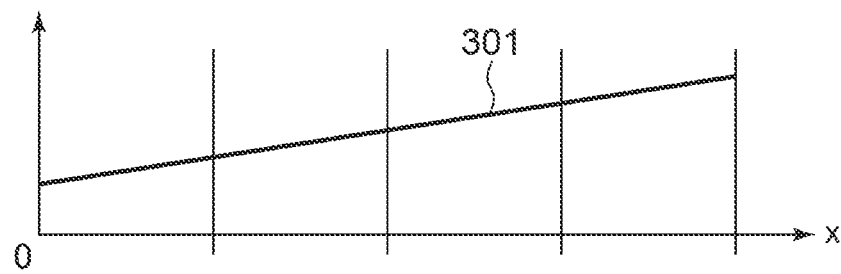
FIG. 3A is a graph showing an output signal of the relative sensor when a lens holding frame included in the lens barrel in FIG. 1A moves.
Figure 3B:
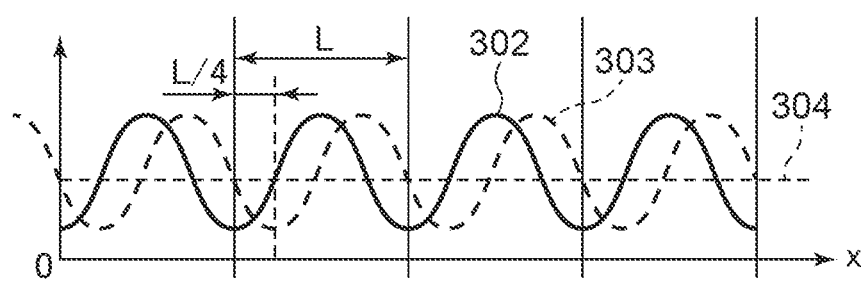
FIG. 3B is a graph showing an output signal of the absolute sensor when the lens holding frame moves.
Figure 3C:
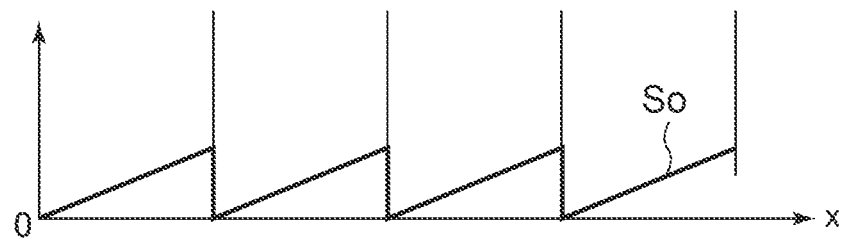
FIG. 3C is a graph showing an operation signal.

Next, the configurations of the absolute sensor 200 and the relative sensor 210, the detection method and the characteristic feature will be described by referring to FIG. 2A through FIG. 2D and FIG. 3A through FIG. 3C. FIG. 2A is a side view of the absolute sensor 200. FIG. 2B is a front view of the absolute sensor 200. FIG. 2C is a side view of the relative sensor 210. FIG. 2D is a front view of the relative sensor 210. It should be noted that a coordinate system shown in FIG. 2A through FIG. 2D and FIG. 3A through FIG. 3C is a relative coordinate system in the sensor that is different from the coordinate system in FIG. 1A and FIG. 1B. Moreover, FIG. 2A through FIG. 2D are schematic views for description. And the relative sizes of the scale and detection unit and the number of cyclic patterns do not coincide with the actual sensor. FIG. 3A through FIG. 3C represent signal levels that are obtained by amplifying and calculating an output signal of each sensor. The details will be mentioned later.

The absolute sensor 200 will be described first. As shown in FIG. 2A, the absolute sensor 200 is configured to arrange the detection unit 201 so as to face the scale 202 in a z-direction. The scale 202 parallelly moves in an x-direction by interlocking with the movement of the lens holding frame 102. As shown in FIG. 2B, the scale 202 has a pattern that has a triangular black part 202a and a triangular white part 202b that are different in reflectance. The pattern has a slant boundary between the parts 202a and 202b so that width of the white part 202b in a y-direction continuously increases in the +x direction (rightward in FIG. 2B).

The detection unit 201 has a light emitting section 201a and a light receiving section 201b on one side. Although the sections 201a and 201b cannot be seen in the direction in FIG. 2B, they are indicated by hatching. As shown by arrows in FIG. 2A, the light emitting section 201a emits light toward the scale 202, and the reflected light from the scale 202 is received by the light receiving section 201b. The light receiving section 201b outputs a signal that is current-voltage converted and amplified. The light receiving amount of the light receiving section 201b varies depending on the position in the x-direction due to difference between reflectance of the black part 202a and reflectance of the white part 202b, and an output signal 301 shown in FIG. 3A is obtained.

FIG. 3A is a graph showing variation of the output signal of the absolute sensor 200 when the lens holding frame 102 moves in the x-direction. The horizontal axis represents the relative position between the detection unit 201 and the scale 202 in the x-direction, and the vertical axis represents an output signal level. Since the width of the white part 202b increases in the +x direction as shown in FIG. 2B, the output signal in FIG. 3A monotonically increases from one end to the other end of a moving range of the lens holding frame 102 at a constant inclination. Since the output signal increases monotonically, the position of the absolute sensor 200 in the x-direction is detectable on the basis of the output signal. That is, the absolute position in the x-direction within the range of the scale 202 is detectable.

Next, the relative sensor 210 will be described. As shown in FIG. 2C, the relative sensor 210 is configured to arrange the detection unit 211 so as to face the scale 212 in the z-direction. The scale 212 parallelly moves in the x-direction by interlocking with the movement of the lens holding frame 102.

As shown in FIG. 2D, the scale 212 has a reading pattern that periodically repeats black parts 212a and white parts 212b alternately by a pitch L in the x-direction as the moving direction. Then, the width of the black part 212a and the white part 212b is equal to L/2 that is a half of the repeat pitch L. FIG. 2D schematically shows a part of the pattern on the scale 212 for description. Larger number of the black and white parts are formed actually than the parts shown in FIG. 2D.

The detection unit 211 has a light emitting section 211a and light receiving sections 211b and 211c on one side. Although the sections 211a, 211b, and 211c cannot be seen in the direction in FIG. 2D, they are indicated by hatching. As shown in FIG. 2D, the light receiving sections 211b and 211c are arranged at positions that are mutually shifted by L/4 that is a quarter of the pitch L in the x-direction. As shown in FIG. 2C, the light emitting section 211a emits light toward the scale 212, and the reflected light from the scale 212 is received by the light receiving sections 211b and 211c. The light receiving sections 211b and 211c output signals. When reading the periodic repeated pattern of the black parts 212a and the white parts 212b, the light receiving sections 211b and 211c output the signals shown in FIG. 3B that vary depending on the position in the x-direction.

FIG. 3B is a graph showing variation of the output signals of the relative sensor 210 when the lens holding frame 102 moves in the x-direction. The horizontal axis represents the relative position between the relative sensor 210 and the scale 212 in the x-direction, and the vertical axis represents an output signal level. Then, a solid line shows the output signal 302 of the light receiving section 211b, and a broken line shows the output signal 303 of the light receiving section 211c. Hereinafter, the output signal 302 is called A phase signal, and the output signal 303 is called B phase signal.

When the pattern on the scale 212 is read, two signals are output as sine wave signals that are repeated by the pitch L centering around a dashed line 304. Then, an A-phase signal and a B-phase signal are output with a phase shift of L/4 due to the arrangement of the light receiving sections 211b and 211c. When the lens holding frame 102 moves from a certain position to another position, the relative distance between the two positions is detectable by counting the number of periods of the signals by resolution of L/4.

Moreover, an operation signal So as shown in FIG. 3C is obtained by calculation by a CPU of a controller (not shown) using the following formula (1):

$$So = \tan^{-1}(Sb-Sc)/(Sa-Sc) \quad (1)$$

where Sa: output of the A-phase signal 302,
Sb: output of the B-phase signal 303, and
Sc: center of the two sine wave signals.

The above formula (1) detects a phase component in one period by taking arctangent after offsetting the center position of each of the A-phase signal and B-phase signal. As shown in FIG. 3C, the operation signal So exhibits a sawtooth waveform repeated by the period L and monotonically increases within one period. Accordingly, the absolute position within one period is detectable in detail than the resolution of L/4. That is, the relative sensor 210 is able to detect a relative moving amount in detail, when the lens holding frame 102 moves.

Incidentally, the relative sensor 210 cannot detect the absolute position of the lens holding frame 102 unless the lens holding frame 102 moves to an initial position immediately after starting the camera. In the meantime, the absolute sensor 200 is able to detect the absolute position of the lens holding frame 102 without an origin detection action, such as movement to the initial position. However, since the signal output from the absolute sensor 200 monotonically increases over the entire movable stroke of the lens holding frame 102, its resolution is lower than that of the relative sensor 210.

Consequently, the detailed absolute position is detected using the output signals of the absolute sensor 200 and relative sensor 210 and the operation signal. Specifically, the period in which the relative sensor 210 is positioned is detected on the basis of the output of the absolute sensor 200 first, and the detailed absolute position is detected on the basis of the output that is obtained by operating the output of the relative sensor 210 using the above-mentioned formula (1). Thus, the detailed absolute position of the lens holding frame 102 is detectable by using combination of the outputs of the absolute sensor 200 and relative sensor 210 without the origin detection action, such as movement to the initial position, even just after starting the camera.

Next, a problem in a case of using combination the absolute sensor 200 and the relative sensor 210. When one of the detection unit 201 and scale 202 of the absolute sensor 200 shown in FIG. 2A and FIG. 2B moves in a y-direction and relative deviation occurs, the output of the absolute sensor 200 varies as follows.

Figure 4:
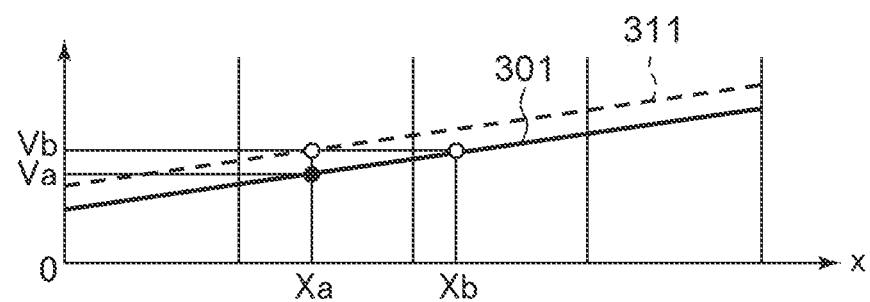
FIG. 4 is a graph describing variation of the output signals of the absolute sensor when deviation occurs.

FIG. 4 is a graph showing the output signal of the absolute sensor 200 of a case where the scale 202 moves relative to the detection unit 201 in the y-direction of the coordinate system in FIG. 2B and deviation occurs. The vertical axis and horizontal axis in FIG. 4 are the same as that in FIG. 3A. The output signal 301 output when there is no deviation is shown by a solid line as with FIG. 3A, and an output signal 311 output when the deviation occurs is shown by a broken line. The output signal 311 rises so as to be shifted upward from the output signal 301 of the case where there is no deviation over the entire area in the x-direction.

This is because the deviation of the scale 202 in the −y direction increases the detection ratio of the white part 202b with high reflectance as compared with the proper state. When such deterioration of the output signal occurs, since the level Vb is output corresponding to the actual position Xa, the position Xb corresponding to the level Vb on the solid line 301 is detected as a result as shown in FIG. 4, which causes the detection error of Xa−Xb.

Since a larger detection stroke is needed as a moving stroke of the lens holding frame 102 increases, the inclination of the boundary between the black part 202a and the white part 202b gets nearer to a horizontal state, which lowers the sensitivity for detecting the moving amount and enlarges the detection error due to the deviation in the y-direction. Moreover, deviation in the z-direction in the coordinate system in FIG. 2A and FIG. 2B also changes the output signal of the absolute sensor 200 and causes a detection error, which is less than the error due to the deviation in the y-direction.

In the meantime, even if one of the detection unit 211 and the scales 212 of the relative sensor 210 moves and is deviated relatively in the y-direction like the above case, the output signal is not different from the case in FIG. 3B. This is because the black part 212a and the white part 212b of the scale 212 are arranged as a pattern alternately repeated in the x-direction and do not vary in the y-direction.

That is, the operation signal generated from the A-phase signal and B-phase signal of the relative sensor 210 is the same as the solid line So in FIG. 3C, and the deviation in the y-direction does not cause the detection error in principle. Even if the deviation in the y-direction occurs, the direction error does not occur as long as the scale 212 is located within the detection range of the light emitting section 211a and the light receiving section 211b.

When the characteristic features of the above sensors are taken into consideration, the following problem occurs depending on the arrangements of the sensors in the lens barrel 100 in which the lens holding frame 102 that is supported by the two guide bars 103 and 105 moves parallelly.

Figure 5:
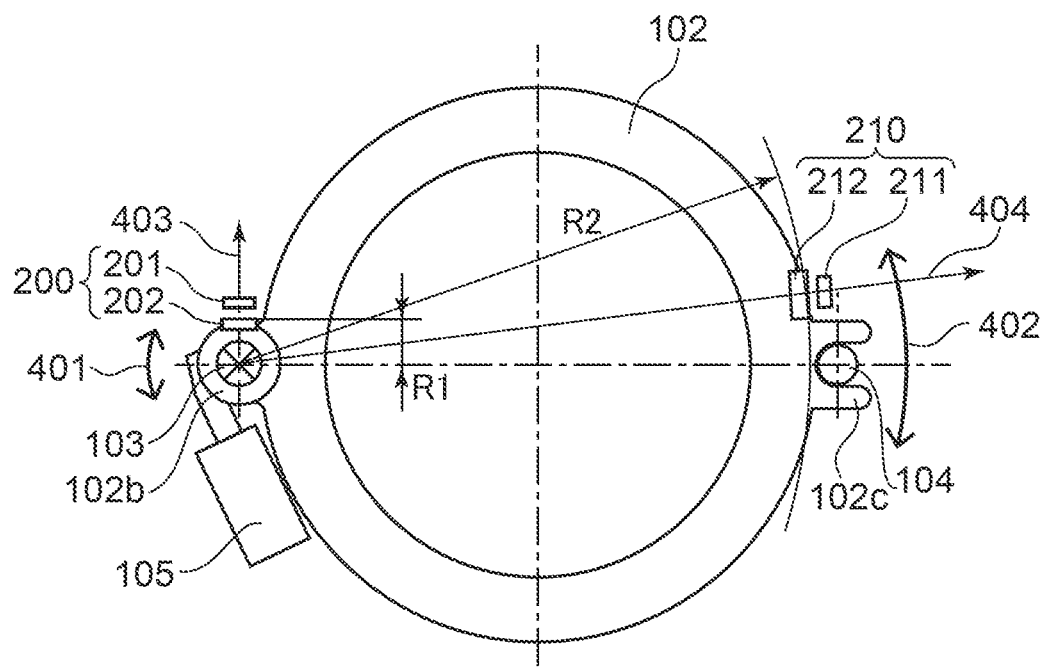
FIG. 5 is a view describing mechanical backlash occurred in the lens barrel in FIG. 1A.

FIG. 5 is a view describing mechanical backlash occurred in the lens barrel 100. As mentioned above, the engagement length in the optical axis direction of the engagement part 102c of the lens holding frame 102 that engages with the sub guide bar 104 is shorter than that of the engagement part 102b of the lens holding frame 102 that engages with the main guide bar 103. When the lens holding frame 102 moves or vibration occurs, the lens holding frame 102 slightly rotates around the main guide bar 103 as shown by arrows 401 and 402 shown in FIG. 5, which generates mechanical backlash. Since the lens holding frame 102 rotates around the main guide bar 103, a deviation amount near the main guide bar 103 and engagement part 102b is small, but a deviation amount near the sub guide bar 104 and engagement part 102c becomes large.

Since a position sensor is preferably arranged at a position where a deviation amount due to backlash becomes small in general, the position sensor should be arranged near the main guide bar 103 in the case of the lens barrel 100 in FIG. 1. However, when the two sensors including the absolute sensor and relative sensor are attached, it is difficult to attach the two sensors near the main guide bar 103 because of physical interference of the two sensors and interference of the light from the light emitting sections to the light receiving sections.

Moreover, a close arrangement of the two sensors may cause problems in intensity and production cost due to complication of the shape of the lens holding frame 102 and may cause a problem in enlargement of the outside diameter of the lens barrel. Moreover, when the detection system of a sensor is a magnetic system, a close arrangement of two sensors may cause misdetection due to magnetic interference.

Accordingly, the absolute sensor 200 is arranged nearer to the main guide bar 103 than the relative sensor 210 as shown in FIG. 1B in this embodiment. Moreover, as shown in FIG. 5, the absolute sensor 200 is arranged in the vicinity of the main guide bar 103 so that the detection unit 201 faces the scale 202 in a direction (a direction of an arrow 403) of a normal line of a circle of a radius R1 around the main guide bar 103.

This improves the position detection accuracy because the deviations in the y-direction and z-direction in the coordinate system in FIG. 2A and FIG. 2B are small even if the lens holding frame 102 slightly rotates in the direction around the main guide bar 103 due to backlash. Moreover, the absolute sensor 200 is arranged at a position at which a line connecting the main guide bar 103 and sub guide bar 104 perpendicularly intersects with a line connecting the absolute sensor 200 and main guide bar 103 when viewed in the optical axis direction. This maintains the position detection accuracy without enlarging the maximum outside diameter of the lens barrel 100 because the maximum outside diameter of the lens holding frame 102 is decided according to the engagement part 102b that engages with the main guide bar 103 and the engagement part 102c that engages with the sub guide bar 104.

In the meantime, the relative sensor 210 is arranged in the vicinity of the sub guide bar 104 so that the detection unit 211 faces the scale 212 in a direction (a direction of an arrow 404) of a normal line of a circle of a radius R2 around the main guide bar 103. Although the deviation amount in the y-direction of the relative sensor 210 in the relative coordinate system in FIG. 2C and FIG. 2D is larger than that of the absolute sensor 200 in the y-direction, the detection error does not occur even if the relative sensor 210 deviates in the y-direction as mentioned above.

Moreover, since the deviation amount in the z-direction in the relative coordinate system in FIG. 2C and FIG. 2D is extremely smaller than the deviation amount in the y-direction, it is negligible. Accordingly, the relative sensor 210 detects a minute movement with sufficient accuracy.

Unpreferable arrangements of the absolute sensor 200 and relative sensor 210 will be described based on the above description. First, a case where the arrangements of the absolute sensor 200 and relative sensor 210 in FIG. 1B are reversed will be described. When the relative sensor 210 is arranged near the main guide bar 103 of which backlash is small, deviation amounts in the y-direction and z-direction in the coordinate system in FIG. 2C and FIG. 2D are small, and the position detection accuracy is high. In the meantime, when the absolute sensor 200 is arranged near the sub guide bar 104 of which backlash is large, the deviation in the y-direction in the coordinate system in FIG. 2A and FIG. 2B causes a large detection error. Accordingly, such an arrangement is not preferable.

Figure 6:
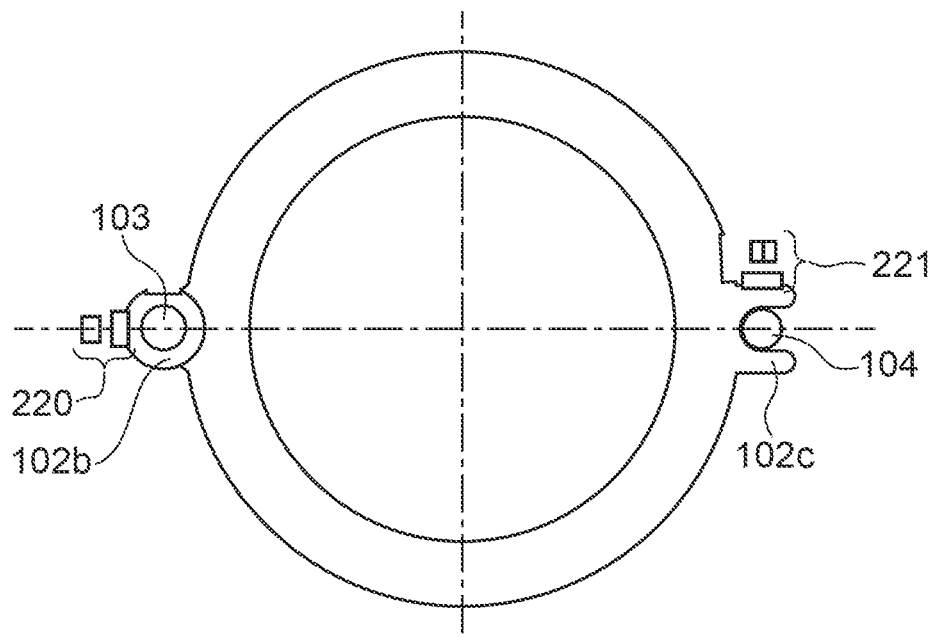
FIG. 6 is a view describing an undesirable arrangement example of the sensors.

Next, another unpreferable arrangement example of the sensors will be described by referring to FIG. 6. FIG. 6 is a front view of the lens barrel showing candidate arrangements 220 and 221 at which the sensors may be arranged. First, when the sensor is arranged as the candidate arrangement 220, since the sensor is arranged near the main guide bar 103 of which a mechanical backlash is small, a detection accuracy is high. However, the sensor is arranged at the position more distant from the optical axis than the main guide bar 103. This enlarges the maximum outside diameter of the lens barrel 100 and is not preferable from a viewpoint of miniaturization.

Next, a case where the detection unit faces the scale in an approximately tangential direction of a circle around the main guide bar 103 as the candidate arrangement 221 will be described. Since the sensor is arranged near the sub guide bar 104, mechanism backlash causes a small deviation in the y-direction and a large deviation in the z-direction in the relative coordinate system in FIG. 2A and FIG. 2B. Since the absolute sensor 200 causes detection errors due to the deviations in the y-direction and z-direction, the candidate arrangement 221 is not preferable. Moreover, when the relative sensor 210 deviates in the z-direction, the output signal varies as shown in FIG. 7A.

Figure 7A:
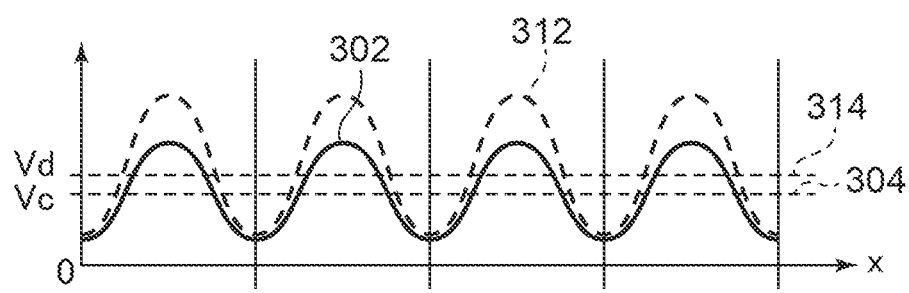
FIG. 7A and FIG. 7B are graphs respectively showing the output signal of the relative sensor and the operation signal when deviation occurs in the relative sensor.
Figure 7B:
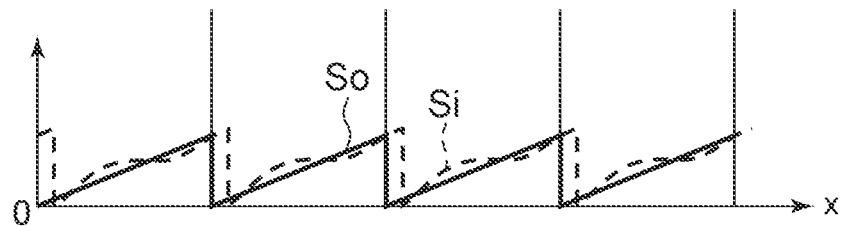

FIG. 7A and FIG. 7B are graphs respectively showing the output signal of the relative sensor 210 and the operation signal when the relative sensor 210 deviates in the z-direction in the relative coordinate system in FIG. 2C and FIG. 2D. FIG. 7A shows only the A-phase signal for simplifying the description. FIG. 7A and FIG. 7B describe the case where the deviation occurs in the direction in which the detection unit 211 and the scale 212 approach in the z-direction. The definitions of the vertical axis and horizontal axis are the same as that in FIG. 3B. Moreover, the A-phase signal corresponding to no deviation is shown by the output signal 302 as with FIG. 3B, and the center of the sine wave signal of the output signal 302 is shown by a broken line 304. The A-phase signal corresponding to some deviation is shown by an output signal 312 and the center of the sine wave signal of the output signal 312 is shown by a broken line 314.

As shown in FIG. 7A, the output signal 312 exhibits the enlarged sign wave due to the deviation in the z-direction in comparison with the output signal 302 with no deviation. As a result, the center value Vc shown by the broken line 304 rises to the center value Vd shown with the broken line 314. It should be noted that the sine wave of the B-phase signal is also enlarged similarly and the center position of the output signal is deviated. When the center value to be offset is deviated at the time of the calculation using the above formula (1), a signal Si shown in FIG. 7B will be obtained.

FIG. 3C shows the operation signal So output when there is no deviation and the operation signal Si output when there is some deviation. Although the operation signal Si monotonically increases repeatedly by the period L as with the operation signal So, changeover positions (peak positions) where periods switch are deviated. This deviation lowers the position detection accuracy of the relative sensor 210. Accordingly, the candidate arrangement 211 in which the detection unit faces the scale in the approximately tangential direction of the circle around the main guide bar 103 is not preferable. It should be noted that the candidate arrangement 220 is permitted when the outside diameter is not taken into consideration.

As mentioned above, in this embodiment, the absolute position of the lens holding frame 102 is detected with high accuracy using the two sensors including the absolute sensor 200 and relative sensor 210. Even when the camera is started, the absolute position of the lens holding frame 102 is detected without the origin detection action.

Next, a lens barrel according to a second embodiment of the present invention will be described by referring to FIG. 8A, FIG. 8B, and FIG. 8C. It should be noted that a part in the second embodiment corresponding to a part in the above-mentioned first embodiment will be described using the same reference numeral. The above-mentioned first embodiment describes the case where temperature inside the lens barrel 100 is an ordinary temperature and the output signals of the absolute sensor 200 and relative sensor 210 do not vary depending on temperature variation. However, if the sensor outputs vary depending on the internal temperature of the lens barrel 100, the following temperature compensation control may be performed. When the internal temperature of the lens barrel 100 varies under a high temperature environment or a low temperature environment, the sensor output signal may increase or decrease.

Figure 8A:
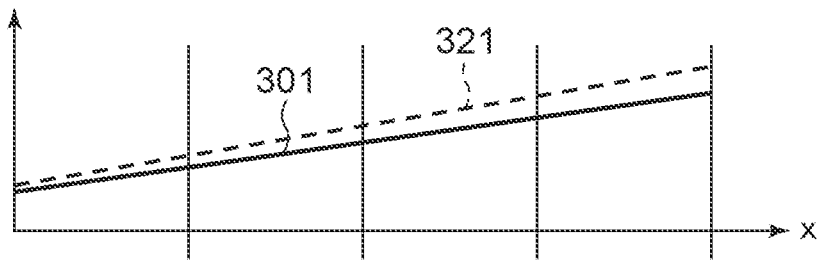
FIG. 8A is a graph showing an output signal of the relative sensor when a lens holding frame included in the lens barrel according to a second embodiment of the present invention moves.
Figure 8B:
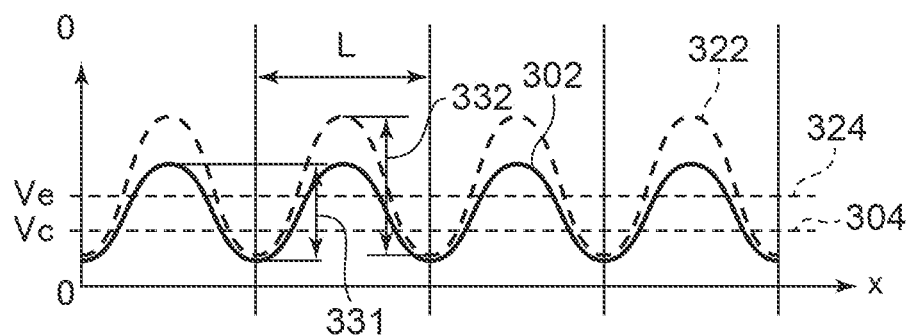
FIG. 8B is a graph showing an output signal of the absolute sensor when the lens holding frame moves.
Figure 8C:
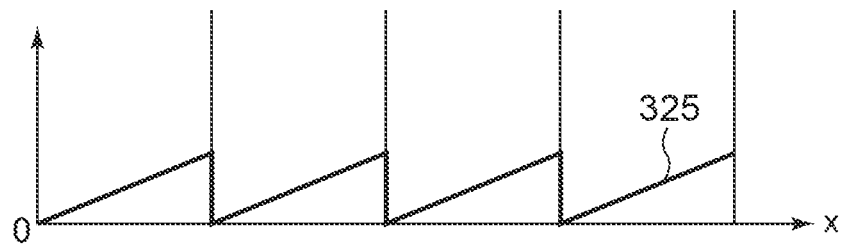
FIG. 8C is a graph showing an operation signal.

FIG. 8A, FIG. 8B, and FIG. 8C are graphs respectively showing output signals of the absolute sensor 200, output signals of the relative sensor 210, and an operation signal. The definitions of the vertical axes and horizontal axes are the same as that in FIG. 3A, FIG. 3B, and FIG. 3C, respectively. FIG. 8A shows the output signals of the absolute sensor 200, and the output signal 301 under an ordinary temperature is indicated by a solid line and the output signal 321 under a low temperature is indicated by a broken line. The output signal 321 rises from the output signal 301 and the position detection using the signal 321 lowers position detection accuracy.

FIG. 8B shows only the A-phase signals among the output signals of the relative sensor 210, and the output signal 302 under the ordinary temperature is indicated by a solid line and the output signal 322 under the low temperature is indicated by a broken line. The sine wave of the output signal 322 is enlarged in comparison with the output signal 302 as with the case in FIG. 7A. As a result, the center value Vc that is the center (broken line 304) of the sine wave signal of the output signal 302 rises to the center value Ve that is the center (broken line 324) of the sine wave signal of the output signal 322.

Consequently, change of the output value corresponding to change of the internal temperature of the lens barrel 100 is measured and recorded beforehand. During operation, a temperature calculation unit of the controller (not shown) estimates a temperature from the output value by using the recorded data and temperature compensation is performed on the basis of the premised temperature.

Specifically, the amplitude of the sign wave of the relative sensor 210 under each temperature inside the lens barrel 100 is recorded as temperature correction data. Moreover, correction values, such as a gain of the output of the absolute sensor 200 and a change of the offset amount, under each temperature are recorded.

In FIG. 8B, an arrow 331 shows the amplitude of the output signal under the ordinary temperature, and an arrow 332 shows the amplitude of the output signal under the low temperature. Under a certain temperature, the output signal within one period is obtained while moving the lens holding frame 102 by the repeating period L of the relative sensor 210, and the amplitude is detected on the basis of the output signal. A temperature inside the lens barrel 100 is estimated using the amplitude of the detected signal by referring to the temperature correction data that is recorded by the temperature calculation unit beforehand.

The output signal of the absolute sensor 200 is corrected so that the output signal 321 becomes the output signal 301 by referring to the correction value of the absolute sensor in the temperature correction data found by the estimated temperature. Thereby, the detection error of the absolute sensor 200 due to temperature change is corrected.

In the meantime, the center value Ve shown by the broken line 324 is calculated from the amplitude of the output signal 322 of the relative sensor 210. Then, the calculated center value is entered to the offset value Sc in the above formula (1) to calculate the operation signal So for each of the A-phase signal and B-phase signal. Since the operation signal 325 in FIG. 8C is found by the above formula (1) using the correct offset value, the position is detectable without lowering the detection accuracy.

In this way, the position is detectable with high accuracy by using the temperature correction data even when the sensor output varies due to change of the temperature inside the lens barrel 100 in this embodiment.

Since the output of the absolute sensor 200 varies monotonically in the entire detection range, the output signal should be checked by moving the lens holding frame 102 from one end to the other end within the detection range in order to estimate a temperature on the basis of the output of the absolute sensor 200.

In the meantime, since the output signal of the relative sensor 210 is repeated periodically, the amplitude of the signal is detected and a temperature is estimated by moving the lens holding frame 102 within one period. When the camera is started, the absolute position is detectable with high accuracy by moving the lens holding frame 102 by one period L of the repeated pattern as an initial action and by performing the temperature compensation.

Accordingly, the time needed to detect the position is shortened significantly in comparison with a case where the lens holding frame 102 is driven to the initial position immediately after starting the camera. The detected position prior to the temperature compensation may be used immediately after starting the camera. And the temperature compensation may be performed after moving the lens holding frame 102 by L/4 in response to a focusing operation command from a camera body. The other configurations and operation effects are the same as that of the above-mentioned first embodiment.

It should be noted that the configuration of the present invention is not limited to the example that has been described in the above-mentioned embodiments, quality of the material, a shape, a size, a formation, the number of elements, arrangement locations, etc., can be changed suitably unless it is deviated from the scope of the present invention.

For example, although the relative sensor 210 has the two light receiving sections 211a and 211b in each of the above-mentioned embodiments, two relative sensors each of which has a single light receiving section may be arranged. In such a case, the detection positions of the two relative sensors should be shifted by L/4.

Moreover, although the position is detected using the noncontact optical sensors as the absolute sensor 200 and the relative sensor 210 in the above-mentioned embodiments, a sensor of another detection system may be used. For example, when a magnetic sensor is used, a Hall sensor may be used as an absolute sensor and a GMR sensor may be used as a relative sensor.

In this case, the absolute sensor may be configured to use a magnet as a scale, and the magnet and the Hall sensor should be arranged so that a magnetic field monotonically increases with movement. Moreover, the relative sensor may employ a magnetic tape to which a repeated magnetic pattern is magnetized as with the scale 212.

As mentioned above, when the absolute sensor and relative sensor are magnetic sensors, it is difficult to arrange the two sensors at close positions because mutual magnetic interference may occur. Accordingly, the arrangement of the embodiment is preferable. Moreover, the position may be detected by combining a magnetic sensor and an optical sensor. Since a coil of an actuator may give magnetic interference to a magnetic sensor depending on a type of the actuator, it is preferable to employ an optical sensor as the sensor arranged near the actuator.

Moreover, although the lens barrel has been described in each of the above-mentioned embodiments, the present invention may be applied to a single-lens reflex camera that consists of a camera body and a detachable lens barrel, an image pickup apparatus in which a camera body and a lens barrel are united, or other optical apparatuses. In an image pickup apparatus in which a lens barrel is detachable to a camera body, a calculation process for detecting an absolute position may be performed by the controller at the side of the lens barrel or may be performed by the controller at the side of the camera body. Moreover, it is effective also in the absolute position detection for a zooming lens group instead of the focusing lens group.

Moreover, although the sub guide bar 104 is used as the second guide in each of the above-mentioned embodiments, the second guide may be constituted by a part of the lens base plate 101. Such a configuration will be described by referring to FIG. 9A.

Figure 9A:
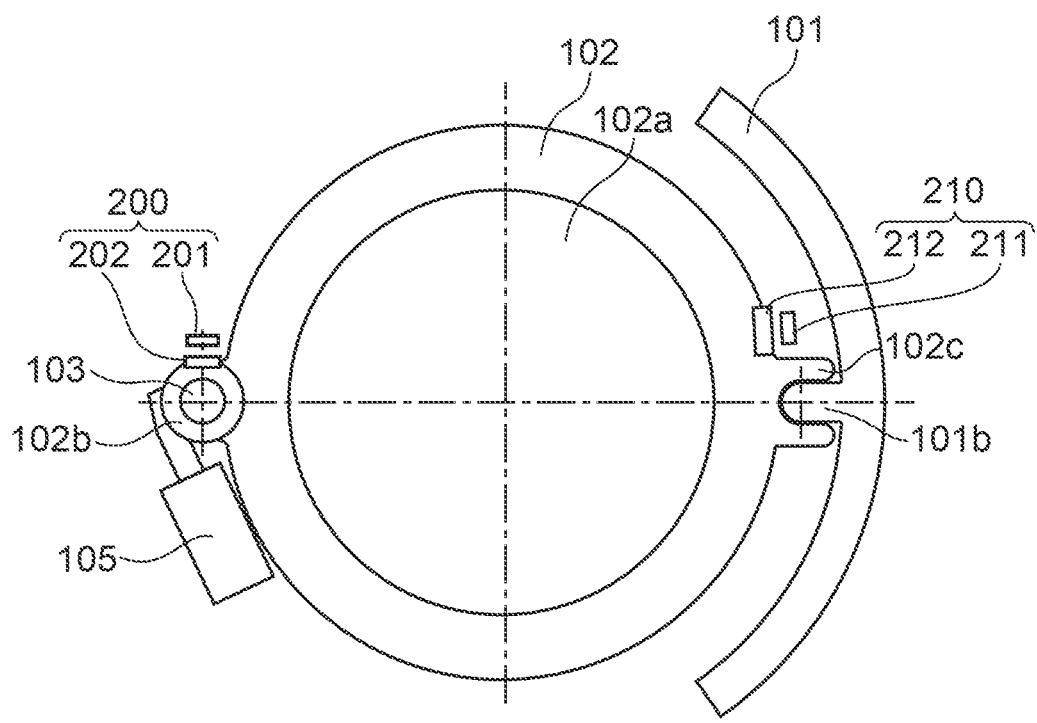
FIG. 9A and FIG. 9B are views showing a lens barrel according to another embodiment of the present invention.

FIG. 9A is a front view in the case of constituting a second guide from a part of lens base plate 101. FIG. 9A shows the lens base plate 101 while omitting a part thereof. Unlike the above-mentioned embodiments, a guide projection part 101b is provided in place of the sub guide bar 104. The guide projection part 101b engages an engagement part 102c consisting of a U-shaped groove of the lens holding frame 102, and suppresses the rotation of the lens holding frame 102 at the time of movement in the optical axis direction. Then, the absolute sensor 200 and the relative sensor 210 are arranged at the same positions as the arrangement positions on the lens-barrel 100 in FIG. 1.

In this way, when the second guide is constituted by a part of the lens base plate 101, the number of components and the cost are reduced and the assembly is simplified. It should be noted that the guide projection part 101b of the lens base plate 101 is difficult to manage the engagement gap with the engagement part 102c strictly in comparison with the sub guide bar 104. However, the arrangements of the absolute sensor 200 and relative sensor 210 in this embodiment is effective to the configuration with the guide projection part 101b because the detection error due to backlash is reduced.

Figure 9B:
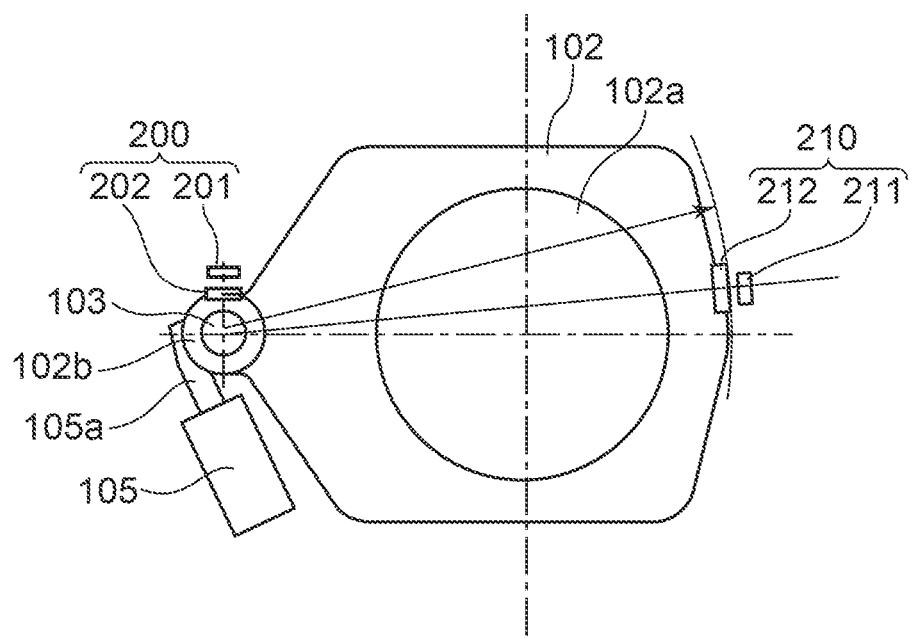

Moreover, although the sub guide bar 104 is used as the second guide in each of the above-mentioned embodiments, the second guide may not necessarily be provided. The configuration without the second guide will be described by referring to FIG. 9B. FIG. 9B is a view showing a configuration of the lens holding frame 102 that is supported by the main guide bar 103 and the connection part 105a of the linear actuator 105. The sub guide bar 104 is not provided in purpose of miniaturization and cost reduction.

In FIG. 9B, the connection part 105a suppresses rotation of the lens holding frame 102 around the main guide bar 103. However, since there is mechanical backlash at the connection part 105a in the linear actuator 105 and the connection part 105a is close to the main guide bar 103, the mechanical backlash becomes larger than that in the case where the sub guide bar 104 is provided.

Consequently, as shown in FIG. 9B, the absolute sensor 200 is arranged near the main guide bar 103 and the relative sensor 210 is arranged at a farther position from the main guide bar 103 so that the detection unit 211 faces the scale 212 in the normal line direction of the circle around the main guide bar 103. This prevents the detection accuracy from lowering, even if the lens holding frame 102 causes rotating backlash around the main guide bar 103.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-248093, filed Dec. 25, 2017, which is hereby incorporated by reference herein in its entirety.

What is claimed is:

1. A lens barrel comprising:
a movable part that has an optical element included in an optical system;
a first guide bar that guides movement of the movable part in an optical axis direction of the optical system;
a first sensor unit that comprises a first scale and a first detection unit, the first scale being provided in the movable part and having a pattern that makes a signal output from the first detection unit monotonically increase from one end to the other end of a moving range of the movable part, the first detection unit outputting the signal that continuously increases or decreases according to movement of the movable part by reading the pattern of the first scale;
a second sensor unit that comprises a second scale that is provided in the movable part and has a periodic repeated pattern in a moving direction of the movable part and a second detection unit that outputs a periodic signal corresponding to movement of the movable part by reading the pattern of the second scale;
a controller configured to detect a position of the movable part in the optical axis direction based on the signal output from the first detection unit and the signal output from the second detection unit; and
a second guide bar that is arranged in parallel to the first guide bar, guides movement of the movable part in the optical axis direction, and suppresses rotation of the movable part around the first guide bar,
wherein the first sensor unit is arranged nearer to the first guide bar in comparison with the second sensor unit, and
wherein the second sensor unit is arranged nearer to the second guide bar in comparison with the first sensor unit.

2. The lens barrel according to claim 1, wherein the first sensor unit is a noncontact position sensor in which the first scale does not contact with the first detection unit.

3. The lens barrel according to claim 1, wherein at least one of the first detection unit and the second detection unit is an optical detection unit that detects a light amount.

4. The lens barrel according to claim 3, wherein the pattern of the first scale has two parts that are different in reflectance and has a slant boundary between the two parts.

5. The lens barrel according to claim 1, wherein at least one of the first detection unit and the second detection unit is a magnetic detection unit that detects change of a magnetic field.

6. The lens barrel according to claim 1, wherein the first scale faces the first detection unit in a direction that perpendicularly intersects with a line connecting the first guide bar and the second guide bar when viewing in the optical axis direction.

7. The lens barrel according to claim 1, wherein the second sensor is arranged so that it may see from the optical axis direction and the second scale and the second detection unit may face the normal line direction of the circle centering on the shaft of the first guide bar.

8. The lens barrel according to claim 1, further comprising a temperature calculation unit configured to estimate an internal temperature of the lens barrel according to the output value of the second sensor unit,
wherein the controller performs temperature compensation of the output of the second sensor unit based on the internal temperature estimated by the temperature calculation unit.

9. The lens barrel according to claim 1, wherein the optical element mounted on the movable part is one of a focusing lens and a zooming lens.

10. The lens barrel according to claim 1, wherein the first sensor unit is an absolute sensor unit, and the second sensor unit is a relative sensor unit.

11. An optical apparatus equipped with a lens barrel, the lens barrel comprising:
a movable part that has an optical element included in an optical system;
a first guide bar that guides movement of the movable part in an optical axis direction of the optical system;
a first sensor unit that comprises a first scale and a first detection unit, the first scale being provided in the movable part and having a pattern that makes a signal output from the first detection unit monotonically increase from one end to the other end of a moving range of the movable part, the first detection unit outputting the signal that continuously increases or decreases according to movement of the movable part by reading the pattern of the first scale;
a second sensor unit that comprises a second scale that is provided in the movable part and has a periodic repeated pattern in a moving direction of the movable part and a second detection unit that outputs a periodic signal corresponding to movement of the movable part by reading the pattern of the second scale;
a controller configured to detect a position of the movable part in the optical axis direction based on the signal output from the first detection unit and the signal output from the second detection unit; and
a second guide bar that is arranged in parallel to the first guide bar, guides movement of the movable part in the optical axis direction, and suppresses rotation of the movable part around the first guide bar,
wherein the first sensor unit is arranged nearer to the first guide bar in comparison with the second sensor unit, and
wherein the second sensor unit is arranged nearer to the second guide bar in comparison with the first sensor unit.

* * * * *